(12) United States Patent
Lin et al.

(10) Patent No.: US 9,796,061 B2
(45) Date of Patent: Oct. 24, 2017

(54) DEVICE FOR CALIBRATING DRILL BILL OF A CHUCK

(71) Applicants: Chi-Kuo Lin, Taichung (TW); Chi-Wen Lin, Taichung (TW)

(72) Inventors: Chi-Kuo Lin, Taichung (TW); Chi-Wen Lin, Taichung (TW)

(*) Notice: Subject to any disclaimer, the term of this patent is extended or adjusted under 35 U.S.C. 154(b) by 323 days.

(21) Appl. No.: 14/676,784

(22) Filed: Apr. 1, 2015

(65) Prior Publication Data
US 2015/0202729 A1    Jul. 23, 2015

(51) Int. Cl.
*B23Q 17/22*  (2006.01)
*B23Q 17/24*  (2006.01)
*B24B 3/24*   (2006.01)

(52) U.S. Cl.
CPC ..... *B23Q 17/2225* (2013.01); *B23Q 17/2457* (2013.01); *B24B 3/24* (2013.01)

(58) Field of Classification Search
IPC .............. B23Q 17/2225,17/2457, 17/22; B24B 3/24, 3/26
See application file for complete search history.

(56) References Cited

U.S. PATENT DOCUMENTS

| 2,932,135 | A  | * | 4/1960  | Tatar    | B24B 3/26    |
|           |    |   |         |          | 451/461      |
| 3,912,925 | A  | * | 10/1975 | Gaskell  | B23B 49/001  |
|           |    |   |         |          | 250/221      |
| 5,155,556 | A  | * | 10/1992 | Foanio   | B23Q 17/0938 |
|           |    |   |         |          | 33/201       |
| 6,206,357 | B1 | * | 3/2001  | Peck     | B23Q 3/18    |
|           |    |   |         |          | 269/309      |
| 6,328,505 | B1 | * | 12/2001 | Gibble   | B25H 1/0092  |
|           |    |   |         |          | 408/16       |
| 2002/0002885 | A1 | * | 1/2002 | Luik    | B23B 31/00   |
|           |    |   |         |          | 82/118       |
| 2009/0179371 | A1 | * | 7/2009 | Sandmeier | B23B 31/1071 |
|           |    |   |         |          | 269/309      |

FOREIGN PATENT DOCUMENTS

DE  202015101721 U1 * 4/2015 ........... B23B 31/201

* cited by examiner

*Primary Examiner* — Christopher Harmon

(57) ABSTRACT

A device for calibrating a drill bit of a chuck includes an intermediate sleeve including two rear curved elements, a front shoulder, internal threads rearward of the shoulder, and an externally threaded extension projecting out of a front end; a front window including a diametrical calibrating line; an externally threaded rim secured to the internal threads to urge the window against the shoulder; and a ring having internal threads secured to the extension. A fastening of the chuck and the device, a loosening of the retainer ring, and a rotation of the rear holding member to rotate the drill bit can align the drill bit with the calibrating line.

1 Claim, 13 Drawing Sheets

DEVICE FOR CALIBRATING DRILL BILL OF A CHUCK

BACKGROUND OF THE INVENTION

1. Field of the Invention

The invention relates to chucks and more particularly to a device for calibrating a drill bit of a chuck.

2. Description of Related Art

Devices for calibrating a drill bit of a chuck are well known. However, the drill bit is not precisely calibrated after being calibrated by the device. This is because the typical calibration devices are disadvantageous. Thus, the need for improvements of the calibration device exists.

SUMMARY OF THE INVENTION

It is therefore one object of the invention to provide a device for calibrating a drill bit of a chuck comprising an intermediate sleeve including two rear curved elements, a front shoulder, internal threads rearward of the shoulder, and an externally threaded extension projecting out of a front end; a front window including a diametrical calibrating line; an externally threaded rim secured to the internal threads to urge the window against the shoulder; and a ring having internal threads secured to the extension; wherein a fastening of the chuck and the device, a loosening of the retainer ring, and a rotation of the rear holding member to rotate the drill bit are configured to align the drill bit with the calibrating line.

The above and other objects, features and advantages of the invention will become apparent from the following detailed description taken with the accompanying drawings.

DETAILED DESCRIPTION OF THE INVENTION

Figure 1:
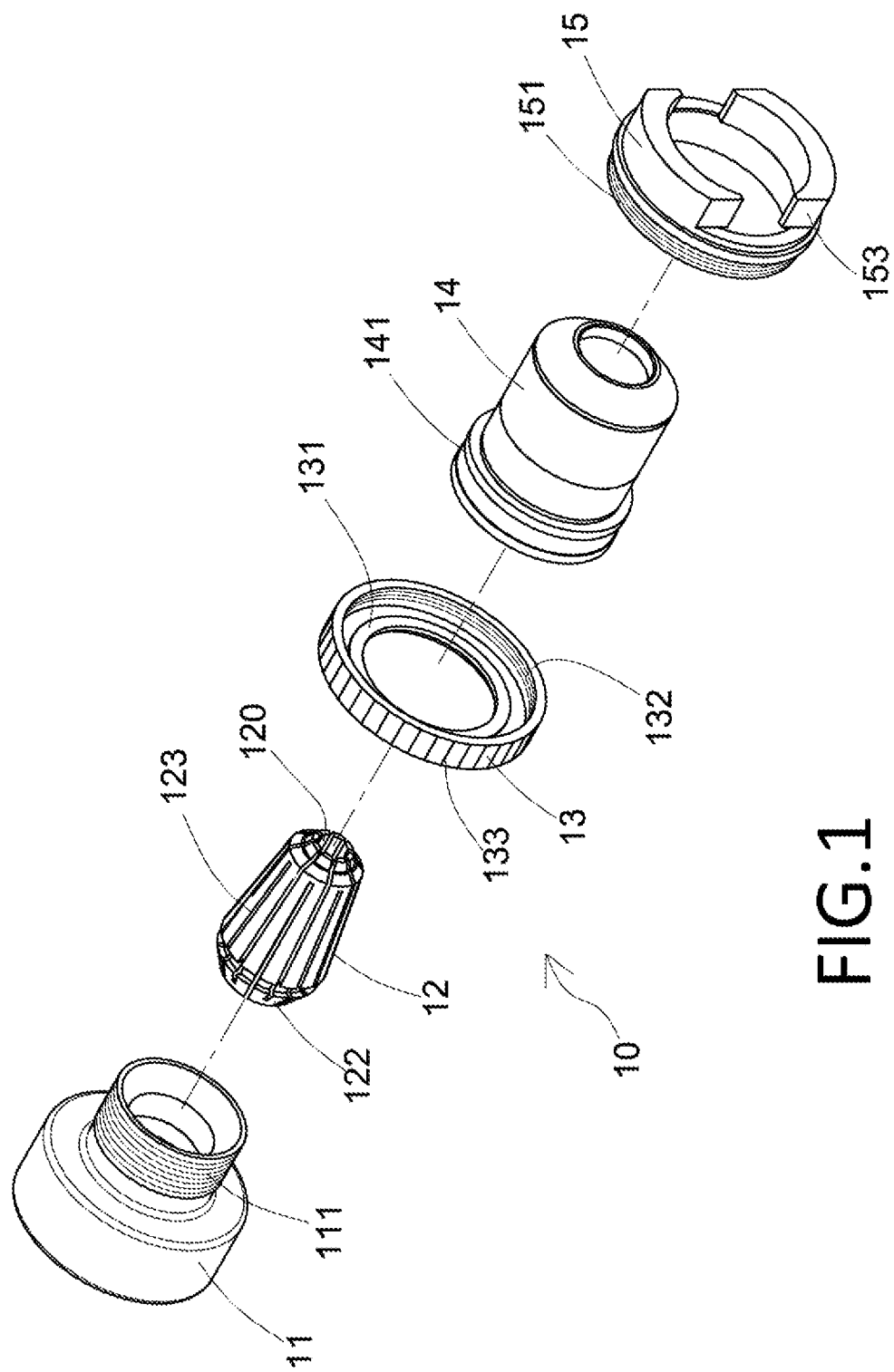
FIG. 1 is an exploded view of a chuck according to the invention.
Figure 2:
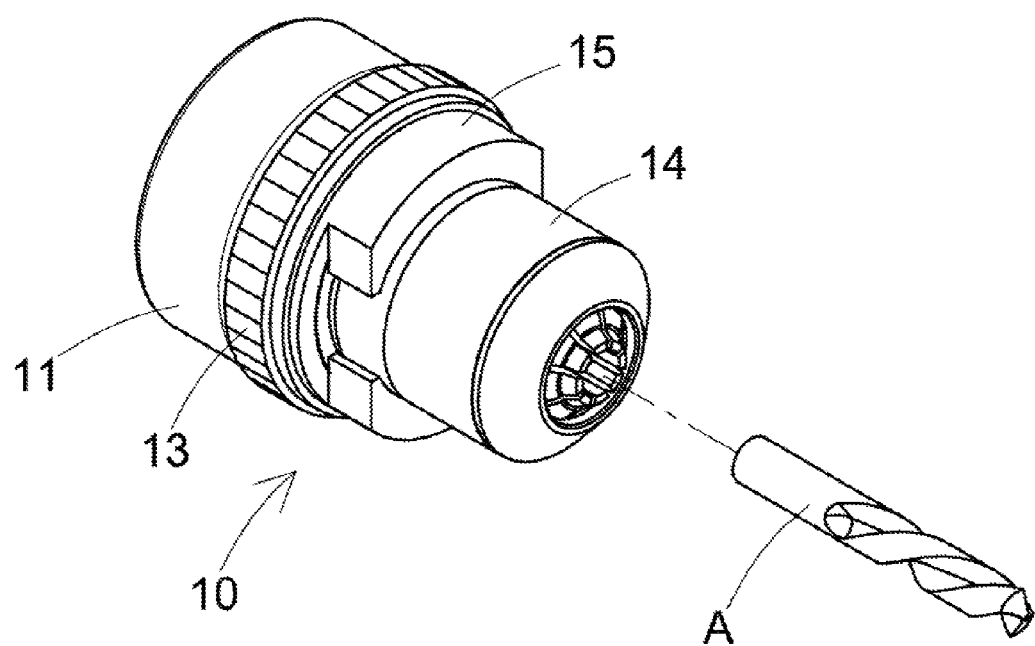
FIG. 2 is a perspective view of the chuck to be mounted with a drill bit.
Figure 3:
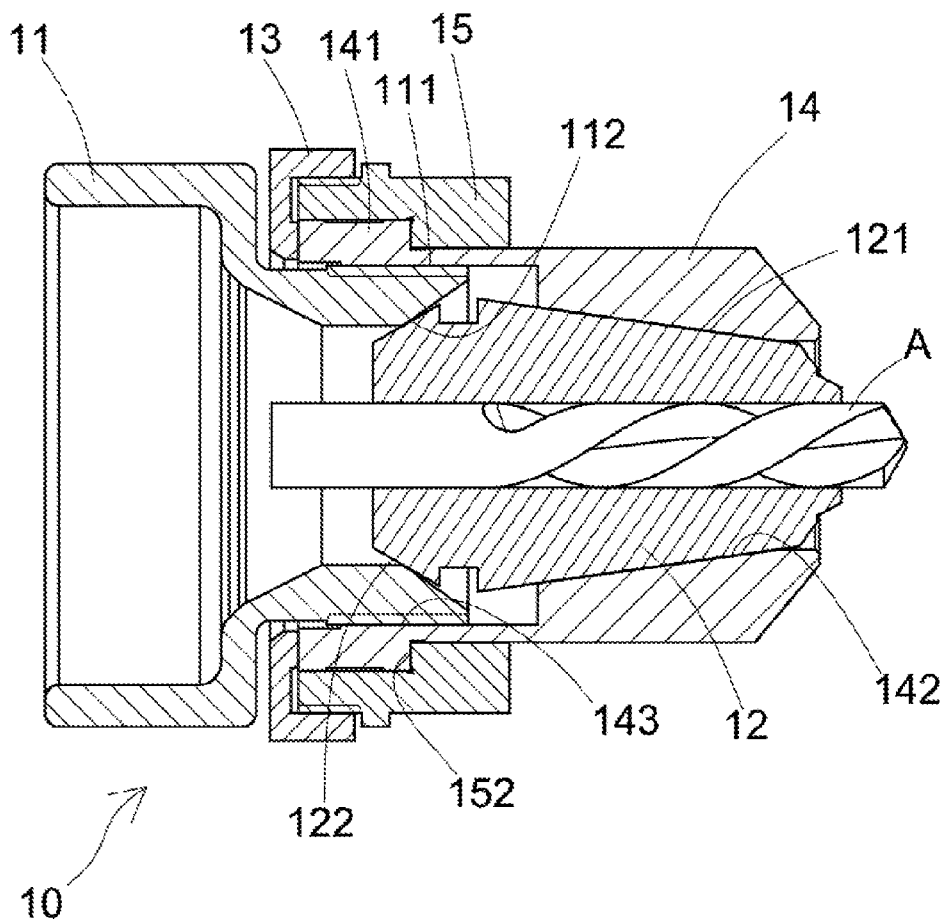
FIG. 3 is a longitudinal sectional view of the assembled chuck and the drill bit.
Figure 4:
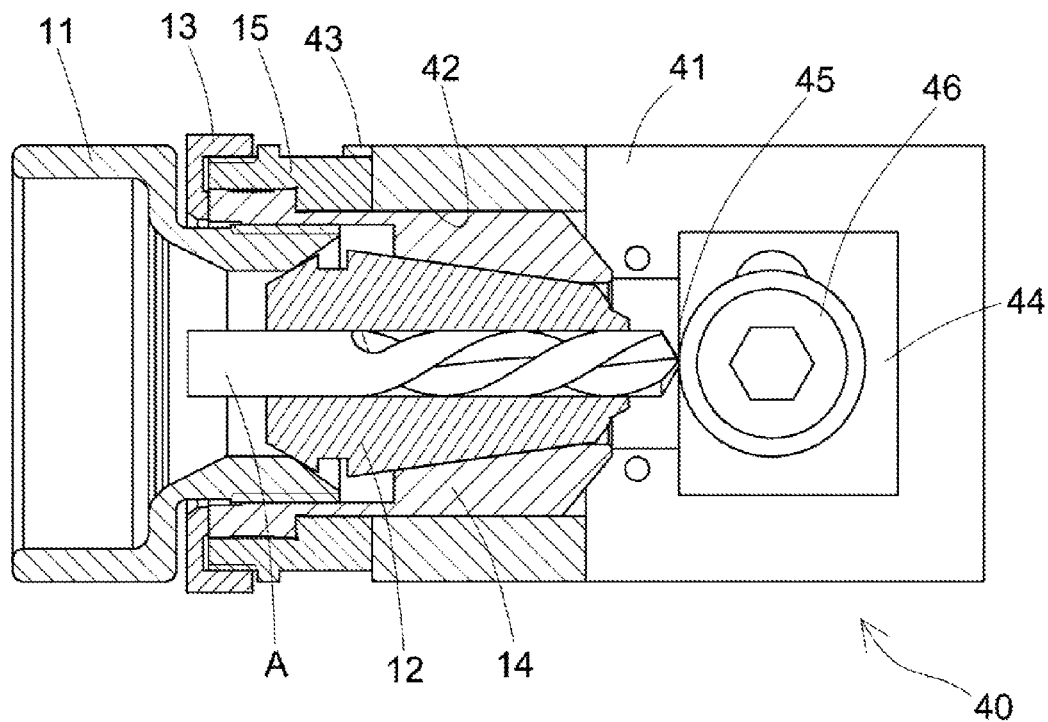
FIG. 4 is a view similar to FIG. 3 with a positioning device mounted thereon.
Figure 5:
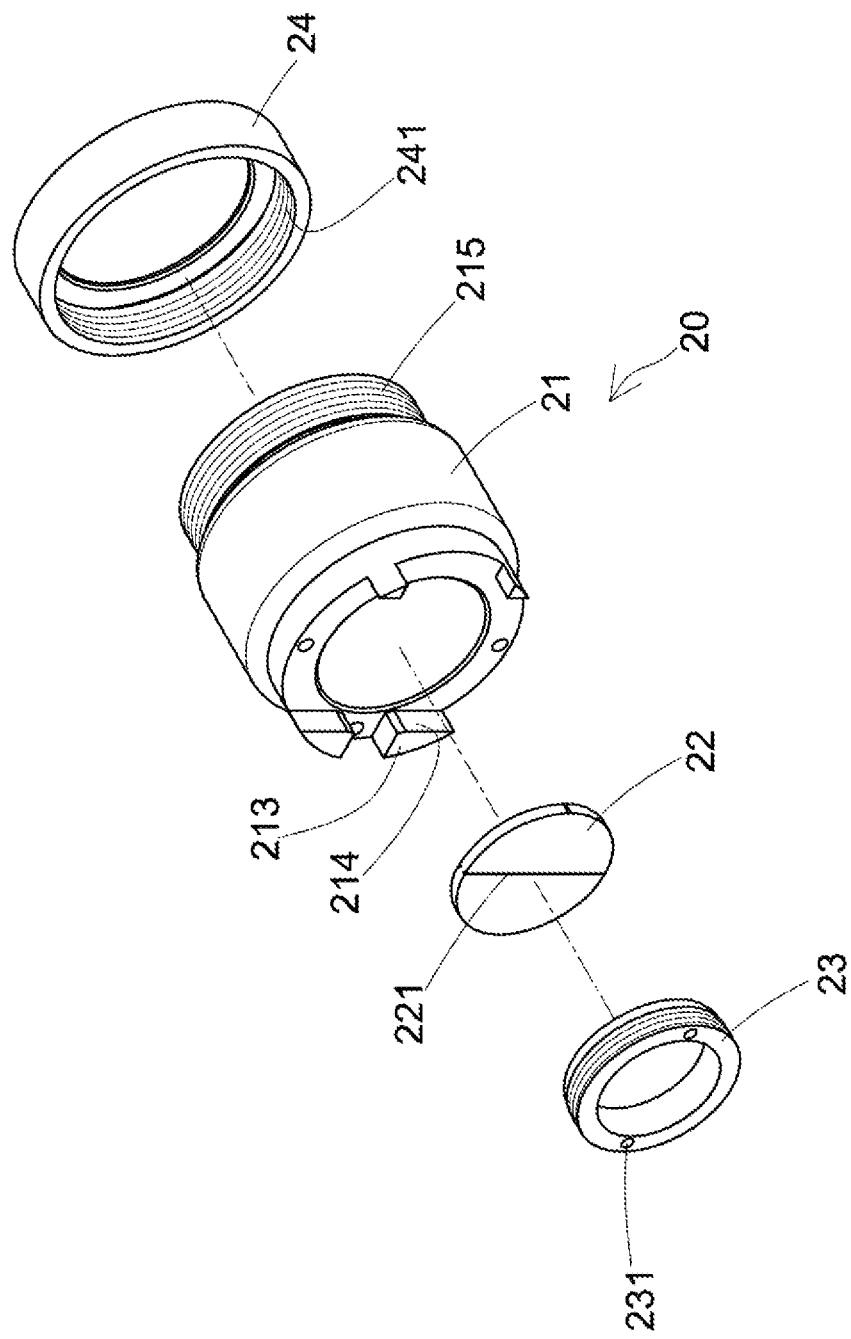
FIG. 5 is an exploded view of a calibration device according to the invention.
Figure 6:
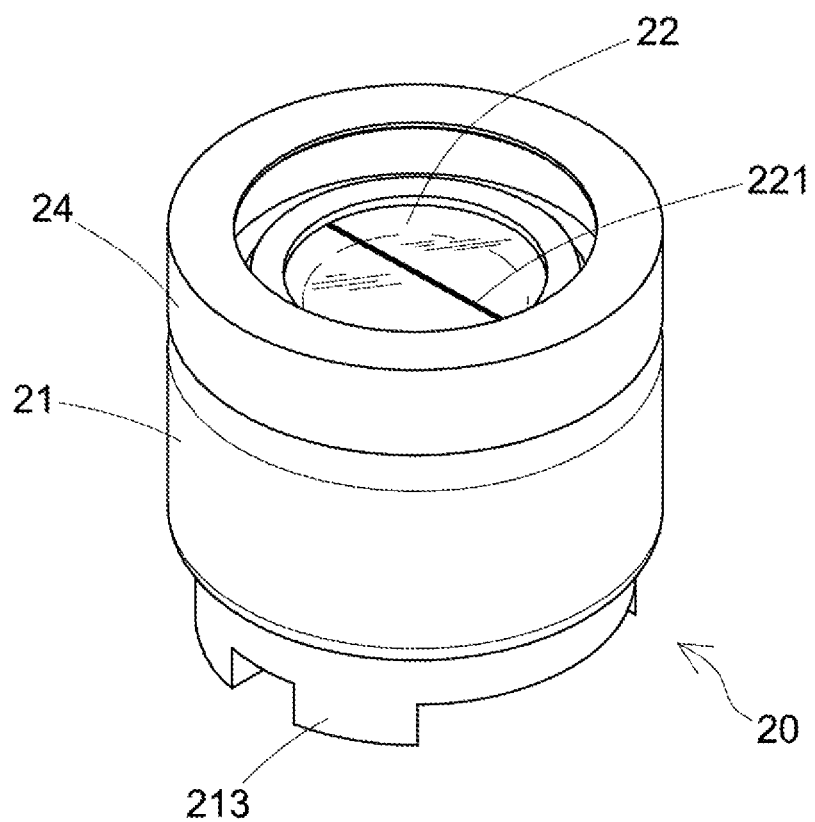
FIG. 6 is a perspective view of the assembled calibration device.
Figure 7:
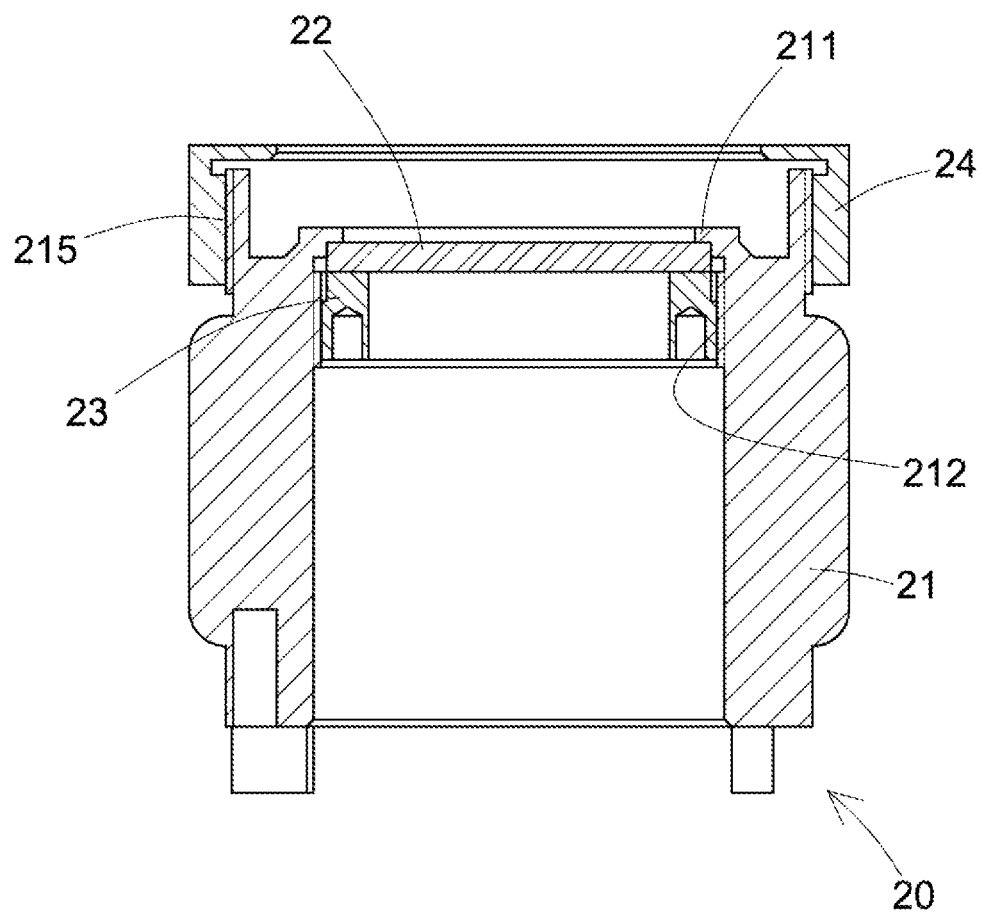
FIG. 7 is a longitudinal sectional view of FIG. 6.
Figure 8:
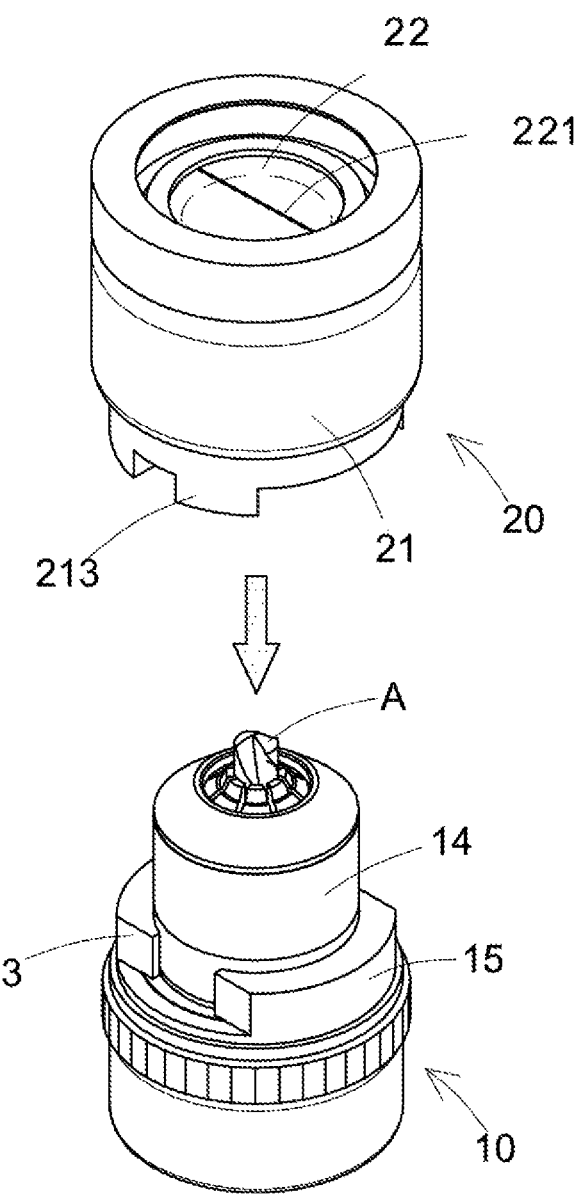
FIG. 8 is a perspective view of the chuck mounted with the drill bit to be joined the calibration device.
Figure 9:
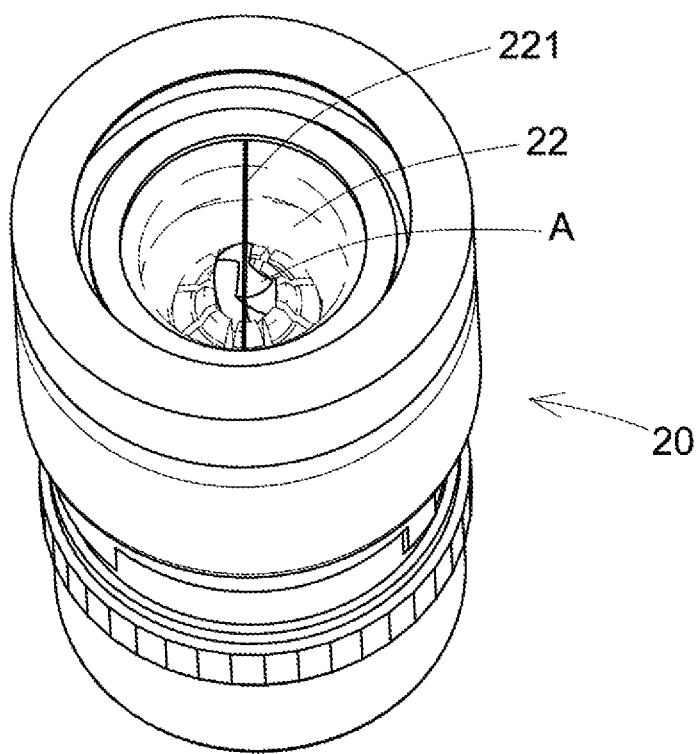
FIG. 9 is a perspective of the assembled chuck, the drill bit, and the calibration device.
Figure 10:
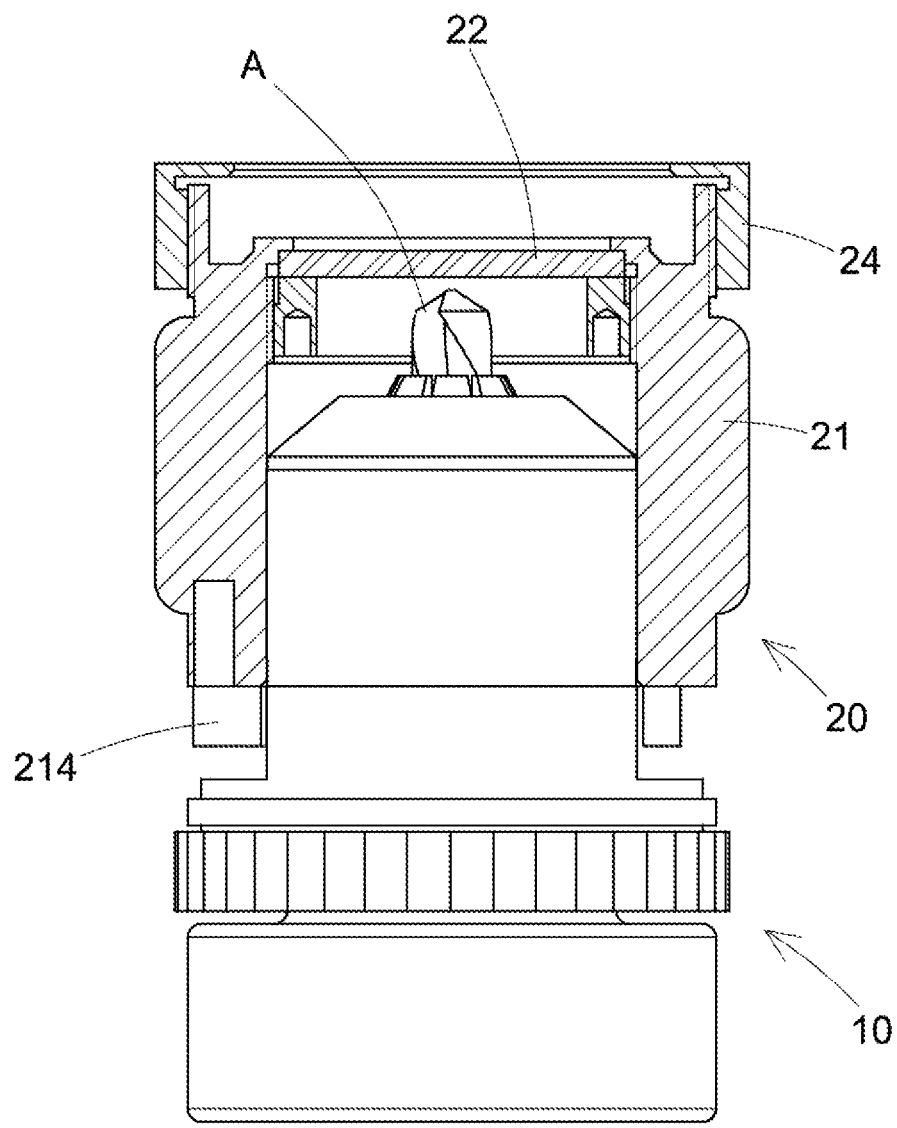
FIG. 10 is a side elevation in part section of FIG. 9.
Figure 11:
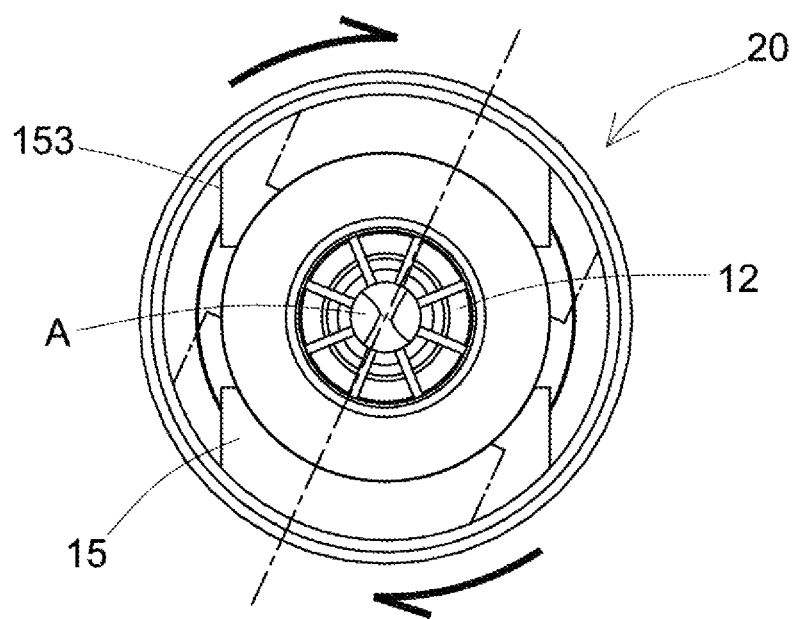
FIG. 11 is a front view of FIG. 9 showing a calibration operation of the drill bit.
Figure 12:
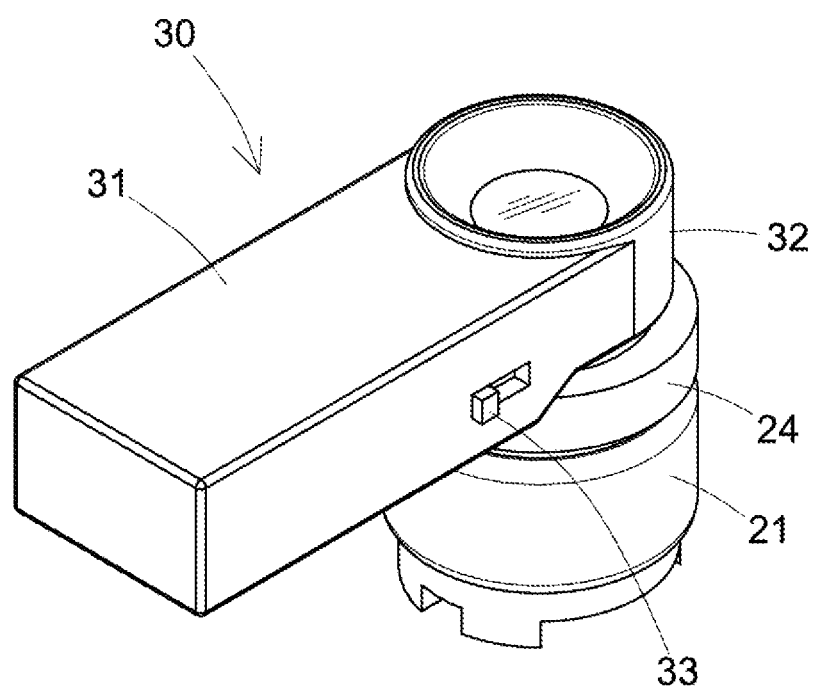
FIG. 12 is a perspective view of the assembled calibration device and a magnifying device.
Figure 13:
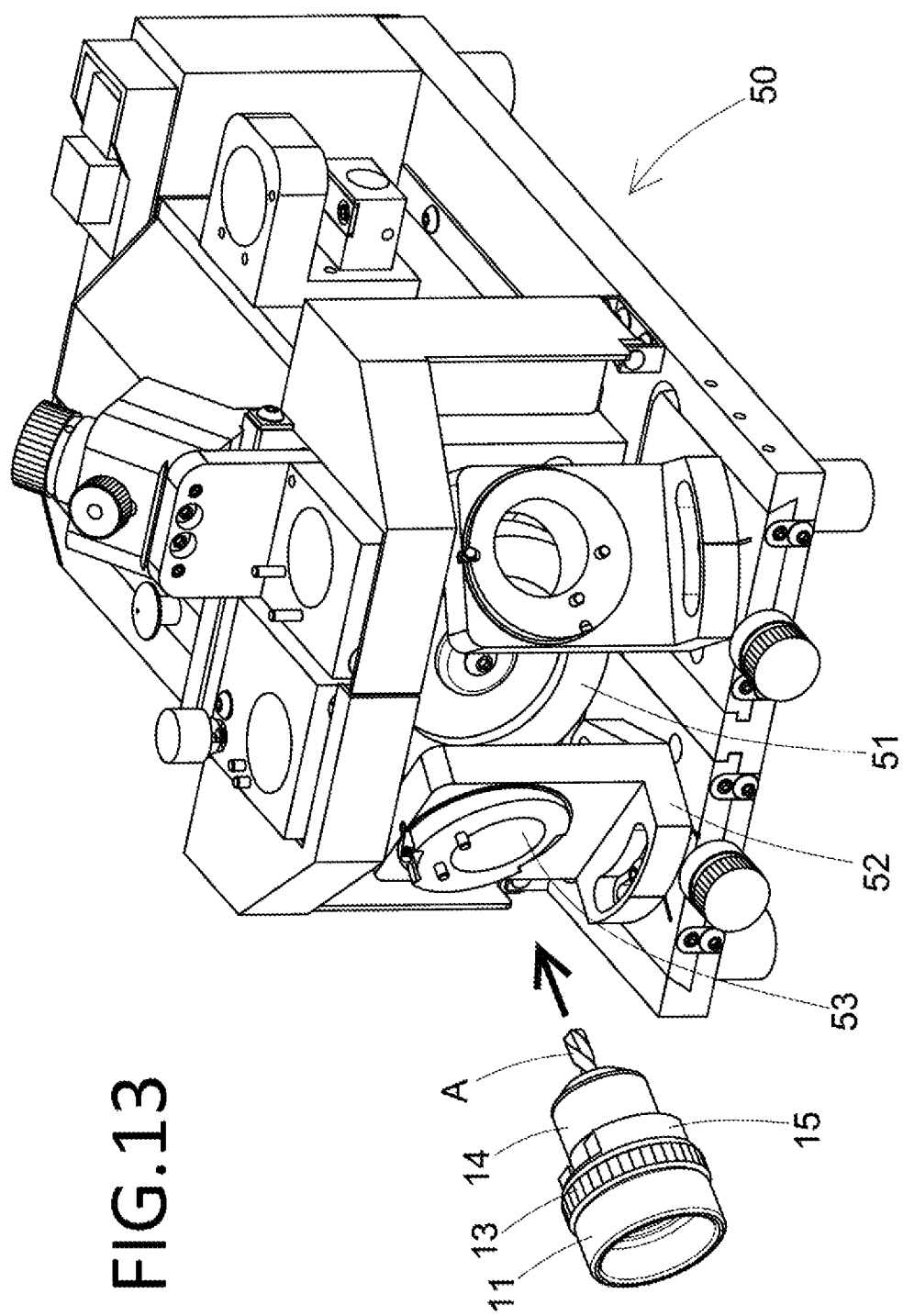
FIG. 13 is a perspective view of a grinding machine for grinding a drill bit mounted on the chuck.

Referring to FIGS. 1 to 13, a calibration device 20 for a drill bit A of a chuck 10 in accordance with the invention is shown. The chuck 10 comprises the following components.

A rear holding member 11 includes a front externally threaded projection 111 and a varied-diameter passage 112. A flexible clamping member 12 includes a conic section 121 having a plurality of longitudinal slits 123, a rear tapered section 122, and an axial channel 120. A retainer ring 13 includes an inwardly extending annular member 131, an internally threaded section 132, and an annular knurled member 133 on an outer surface. A front holding member 140 includes a rear flange 141, a front conic passageway 142, and internal threads 143 rearward of the conic passageway 142. A fastening ring 15 includes rear threads 151, an internal shoulder 152, and two front opposite curved members 153. A positioning device 40 includes a seat 41, a hole 42 in the seat 41, a block member 43 opposite to the hole 42, an urging surface 44, and a bolt 45 for securing the block member 43 to the seat 41.

The clamping member 12 is urged against the passage 112. The retaining ring 13 is put on an intermediate portion of the rear holding member 11. A drill bit A has a rear end inserted through the channel 120 into an intermediate portion of the passage 112. The front holding member 140 has a rear end urging against the annular member 131, the internal threads 143 are secured to the externally threaded projection 111, and inclined inner surface of the front holding member 140 urges against and compresses the conic section 121. The front holding member 140 is inserted into the hole 42 until the fastening ring 15 is stopped by the seat 41 and the tip of the drill bit A is stopped by the urging surface 44. The rear holding member 11 is rotated to fasten the drill bit A in the conic section 121. Finally, the chuck and the drill bit A are detached from the positioning device 40.

A calibration device 20 includes an intermediate sleeve 21 having two rear curved elements 213 having a flat surface 214, a front shoulder 211, internal threads 212 rearward of the shoulder 211, and an externally threaded extension 215 projecting out of a front end; a disc-shaped front window 22 having a diametrical calibrating line 221 engaged the shoulder 211; an externally threaded rim 23 secured to the threads 212 to urge the window 22 against the shoulder 211 and having two opposite holes 231 for allowing two tools to insert into so as to fasten or unfasten the rim 23; and a ring 24 having internal threads 241 secured to the extension 215.

In a calibration operation, the curved elements 213 are inserted into a gap between one ends of the curved members 153 to assemble the chuck 10 and the calibration device 20. The retainer ring 13 is loosened. A user may view through the window 22 to check whether the drill bit A is aligned with the calibrating line 221. The user may rotate the rear holding member 11 to rotate the drill bit A for alignment if the drill bit A was not aligned with the calibrating line 221. Finally, the user may fasten the retainer ring 13.

A magnifying device 30 includes a housing 31, a magnifying glass 32 at one end of the housing 31 mounted on the ring 24, one or more light emitting members (not shown) in the housing 31, one or more batteries (not shown) in the housing 31, and a switch 33 on the housing 31 being manually operable to supply electricity from the batteries to the light emitting members or not. The activated light emitting members can illuminate the magnifying glass 32. The magnifying glass 32 can produce a magnified image to determine whether the drill bit A is aligned with the calibrating line 221.

In a grinding operation, the chuck and the drill bit A can be partially inserted into a hole 53 of one of two seat members 52 of a grinding machine 50. The user may activate an abrasive wheel 51 to grind the drill bit A.

While the invention has been described in terms of preferred embodiments, those skilled in the art will recognize that the invention can be practiced with modifications within the spirit and scope of the appended claims.

What is claimed is:

1. A device for calibrating a drill bit of a chuck, the chuck including a rear holding member and a retainer ring put on the rear holding member, the device comprising:
   an intermediate sleeve including two rear curved elements, a front shoulder, internal threads rearward of the front shoulder, and an externally threaded extension projecting out of a front end;
   a front window including a diametrical calibrating line;
   an externally threaded rim secured to the internal threads to urge the window against the shoulder; and
   a ring having internal threads secured to the extension;
   wherein a fastening of the chuck and the device, a loosening of the retainer ring, and a rotation of the rear holding member to rotate the drill bit are configured to align the drill bit with the calibrating line.

* * * * *